United States Patent
Beauvoir

(10) Patent No.: US 6,474,902 B1
(45) Date of Patent: *Nov. 5, 2002

(54) CONNECTOR FOR CONNECTING BEAMS TO COLUMNS

(75) Inventor: Charles Henri Beauvoir, San Francisco, CA (US)

(73) Assignee: ICF Kaiser Engineers, Inc., Fairfax, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/545,042

(22) Filed: Apr. 7, 2000

Related U.S. Application Data

(63) Continuation-in-part of application No. 08/787,221, filed on Jan. 22, 1997, now Pat. No. 6,059,482.

(51) Int. Cl.$^7$ ................................................ B25G 3/00
(52) U.S. Cl. ........................ 403/403; 403/262; 403/187; 52/714; 52/236.6; 52/655.1
(58) Field of Search ................................. 403/262, 187, 403/408.1, 403, 174; 52/236.6, 655.1, 714

(56) References Cited

U.S. PATENT DOCUMENTS

| | | |
|---|---|---|
| 471,610 A | 3/1892 | Hart |
| 508,280 A | 11/1893 | Cavallaro |
| 1,899,799 A | 2/1933 | Edwards |
| 2,146,333 A | 2/1939 | Deming |
| 2,201,826 A * | 5/1940 | Ditchfield ................. 248/200 |
| 2,382,583 A | 8/1945 | Scheyer |
| 2,456,055 A | 12/1948 | Farrar |
| 3,194,527 A | 7/1965 | Gruss |
| 3,674,289 A | 7/1972 | Geraci |
| 3,816,011 A | 6/1974 | Biebuyck et al. |
| 3,938,297 A | 2/1976 | Sato et al. |
| 3,945,741 A | 3/1976 | Wendt |
| 3,960,458 A | 6/1976 | Sato et al. |
| 4,014,089 A | 3/1977 | Sato et al. |
| 4,054,392 A * | 10/1977 | Oppenheim ............. 403/262 X |
| 4,068,964 A | 1/1978 | Stoker |
| 4,074,947 A | 2/1978 | Matake et al. |
| 4,111,578 A | 9/1978 | Sato et al. |

(List continued on next page.)

FOREIGN PATENT DOCUMENTS

| | | |
|---|---|---|
| BE | 470 531 | 1/1947 |
| DE | 654930 A * | 12/1937 |
| DE | 29 40 030 | 4/1981 |
| GB | 2 132 073 | 7/1984 |

*Primary Examiner*—Lynne H. Browne
*Assistant Examiner*—Ernesto Garcia
(74) *Attorney, Agent, or Firm*—Burns, Doane, Swecker & Mathis, LLP

(57) ABSTRACT

A connector according to the present invention includes a bulk head for connection to a column and a plate extending from the bulk head for connection to a beam. The connector is preferably die cast for ease of manufacturing to avoid welded connections which may provide structural weaknesses. The bulk head has a compact tapered shape which provides a reduced surface area end surface coming into contact with the column. This reduced contact area of the end surface provides an advantageous configuration which avoids the prying action of the prior art T-shaped brackets. The plate which extends from the bulk head is adapted to be welded to a beam and includes a tapered portion that diminishes in a width dimension as the tapered portion extends away from the second surface to a free end. Preferably, the plate includes one or more tuning holes for adjusting the yield strength of the plate.

16 Claims, 8 Drawing Sheets

U.S. PATENT DOCUMENTS

| | | |
|---|---|---|
| 4,220,419 A | 9/1980 | Hawes |
| 4,347,015 A | 8/1982 | Olashaw |
| 4,833,799 A * | 5/1989 | Harte et al. .................. 37/231 |
| 4,893,961 A | 1/1990 | O'Sullivan et al. |
| 4,905,436 A | 3/1990 | Matsuo et al. |
| 4,948,328 A * | 8/1990 | Busch .................. 403/262 X |
| 5,020,678 A | 6/1991 | Klein |
| 5,242,239 A | 9/1993 | Hosokawa |
| 5,342,138 A * | 8/1994 | Saito .................... 403/187 X |
| 5,660,017 A | 8/1997 | Houghton |
| 6,059,482 A * | 5/2000 | Beauvoir ............... 52/236.6 X |
| 6,073,405 A * | 6/2000 | Kasai et al. ............ 403/270 X |

* cited by examiner

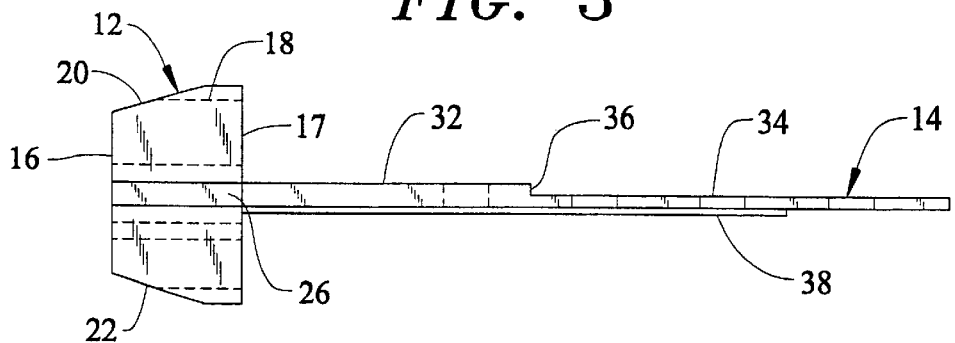
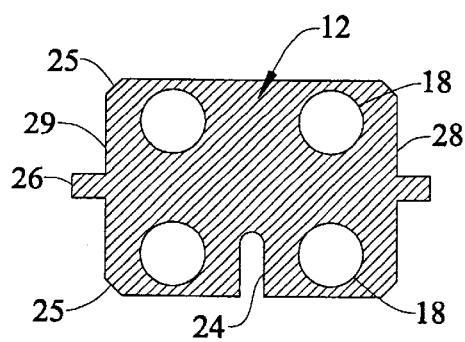
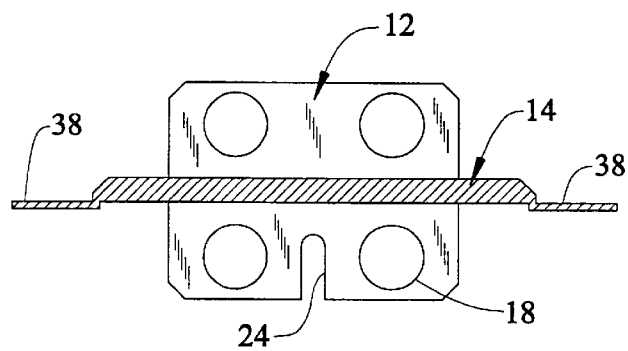
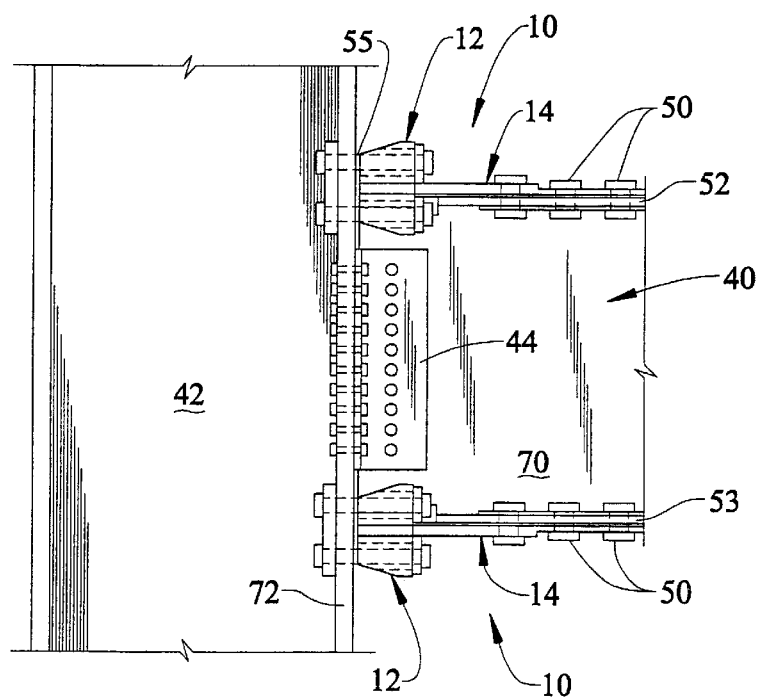

CONNECTOR FOR CONNECTING BEAMS TO COLUMNS

This application is a Continuation-In-Part of U.S. patent application Ser. No. 08/787,221, filed Jan. 22, 1997 now U.S. Pat. No. 6,059,482, which is herein incorporated by reference in its entirety.

BACKGROUND OF THE INVENTION

1. Field of the Invention

The present invention relates to a connector for steel frame structures and more particularly, to a die cast connector for use in steel frame structures to effect a connection between a beam and a column.

2. Description of the Related Art

Steel frame structures such as buildings and the like are typically constructed either with welded connections or bolted fittings between beams and columns to achieve an assembly capable of bracing structures against lateral loads, such as earthquakes, wind, etc.

According to one construction technique, beams are welded to columns. A plate is welded to a column and a beam is welded to the plate. While welded connections between beams and columns are typically satisfactory under most normal loading conditions, these connections may be inadequate when the structure is subjected to abnormal loading conditions such as those that occur during earthquakes or other catastrophic events. High tensile forces placed on a weld between a beam and a column during earthquakes are often sufficient to fracture or otherwise damage the welded connection between beam and column. Thus, the welded connections tend to be the point of structural failure in welded steel frame structures.

An alternative to a welded connection is a semi-rigid connection employing a bolted fitting. One type of bolted fitting for connecting columns and beams which has been used in place of a welded connection employs a T-shaped fitting to provide a bolted connection between the beam and the column. This type of T-shaped connection includes a base plate (top of T) which is bolted to the column and a protrusion which is bolted to the flange of an I-beam by high strength bolts. In connecting a beam to a column, two T-shaped fittings are generally attached by the protrusion to the top and bottom flanges of the I-beam. The base plate of the T-shaped fitting is attached by bolts to the column. However, the bolts which connect the base plate of the fitting to the column may tend to experience a lever effect when the flange of the beam to which the protrusion is bolted is subjected to a tensile force. This lever effect or prying action places a high stress on the bolts. Therefore, various attempts have been made to strengthen these bolted connections. The fittings themselves have been strengthened to such a degree that structures employing these types of fittings tend to have failures which occur in the beams at the location where the connectors end several feet from the center of the column.

Examples of T-shaped fittings are illustrated in U.S. Pat. Nos. 3,960,458, 3,938,297, 4,014,089, and 4,074,947.

Both the known welded and known bolted connections attempt to protect the columns and joints while promoting failure in the beams rather than at the joints. This practice has resulted in solutions which reduce the economy of the steel frame system. The known connections promote hinging/failure in the beam several feet away from the center of the column. The hinging/failure of the beam creates a discontinuity in the beam so that the load carried by the beam is transmitted across the hinged portion of the beam in a different manner than prior to being hinged. Because this hinging occurs several feet from the center of the column, it magnifies the forces experienced by the column (from secondary moments/forces), thus increasing the size of the columns needed and thereby decreasing the economy of the structural steel frame assembly.

The column size may typically need to be further increased over and above design earthquake force requirements to maintain superior strength over the beam that is designed to remain the weak link. Because the structural steel yield and ultimate strengths of the beams can vary greatly due to structural steel milling practices and due to the availability of raw materials, ensuring that a column has superior strength over the beams requires engineering the columns using the worst case upper limit of the strength of the beams. For example, steel specified as having a 50 ksi minimum yield steel may actually have a 65 ksi yield. This increases column sizes which further reduces the economy of these known structures.

In addition, because the known structures promote failure of the beam, the cost of repairing the beams becomes a considerable expense due to the size of the beams, and the lack of adequate access to the beams once the structure has been enclosed by finishes. This reduces further the economy of the systems which promote hinging/failure of the beam.

It would be desirable to provide a connector that is designed to gradually yield under exceptional loads rather than transmit the extreme load to the beam causing the beam to yield. It would also be desirable that the connectors could be inspected and replaced according to whether the connectors showed observable signs of yielding. In addition, if the connector were designed to yield under abnormal loading, only the connector would need to be replaced, thereby reducing the cost of repairing the beam and column structure. Further, it is desirable that a connector be inexpensive to manufacture and have little impact on the overall beam and column structure.

SUMMARY OF THE INVENTION

According to one aspect of the invention, a connector for connecting a beam to a column includes a bulk head and a plate extending from the bulk head. The bulk head has a first surface for abutting a column and a second surface opposite the first surface. The first surface is smaller in area than the second surface. The bulk head also has a plurality of bores connecting the first surface to the second surface. The plate extending from the bulk head includes a tapered portion that diminishes in a width dimension as the plate extends from the second surface toward a free end.

According to yet another aspect of the invention, a connector for connecting beams to columns includes a bulk head having a first surface for abutting a column and a second surface opposite to the first surface. The second surface of the bulk head is greater in area than the first surface. A plurality of bores extend through the bulk head from the first surface to the second surface and receive bolts to connect the bulk head to the column. A plate extends from the second surface of the bulk head and includes one or more tuning holes for adjusting the yield strength of the plate.

According to a another aspect of the invention, a method for connecting a beam to a column is provided. According to the method a connector including a bulk head and a plate is provided. The bulk head has a first surface for abutting a column and second surface opposite the first surface. The bulk head also has a plurality of bores connecting the first surface to the second surface. The plate extending from the bulk head includes a tapered portion that diminishes in a width dimension as the plate extends from the second surface toward a free end. The plate of the connector is welded to the flange of the beam and the bulk head is bolted to the column.

BRIEF DESCRIPTION OF THE FIGURES

The invention will be described in greater detail with reference to the accompanying drawings in which like elements bear like reference numerals, and wherein:

FIG. 3 is a side view of the connector of FIG. 1;

FIG. 4 is a sectional view of the connector taken along line 4—4 of FIG. 2;

FIG. 5 is a sectional view of the connector taken along line 5—5 of FIG. 2;

FIG. 6 is a side view of a column and a beam connected by a connector according to the present invention;

DETAILED DESCRIPTION OF THE INVENTION

Figure 1:
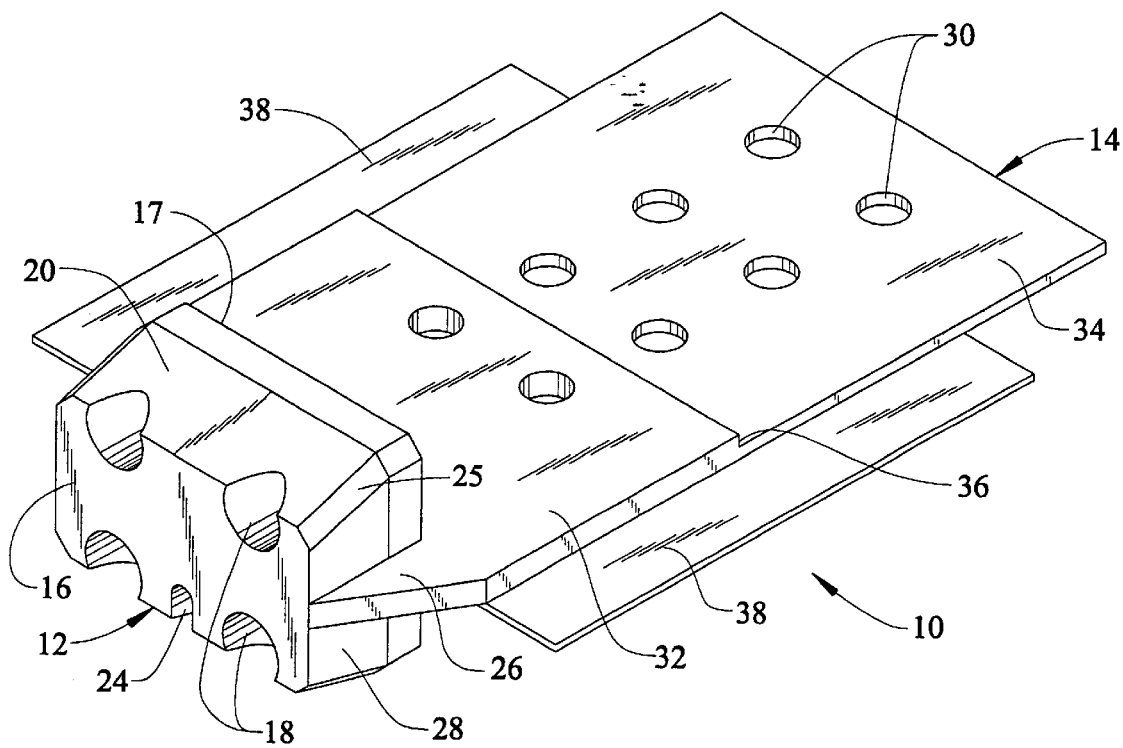
FIG. 1 is a perspective view of a first exemplary embodiment of a connector according to the present invention.
Figure 2:
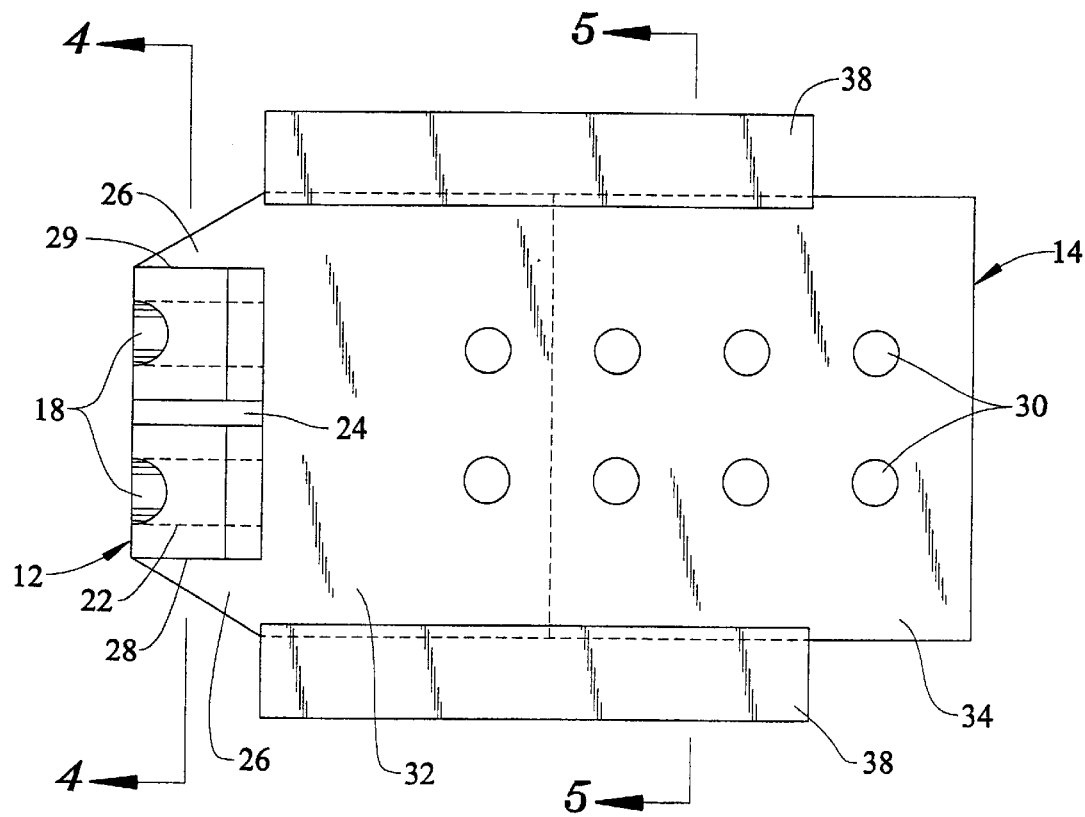
FIG. 2 is a bottom view of the connector of FIG. 1.

A connector for connecting columns to beams according to the present invention addresses the disadvantages of other connectors because by being designed to yield before the connected column or beam. In this way a connector according to the present invention acts as a "fuse" within a column and beam structure. That is, the connector yields before the major components of the structure (columns and beams).

In addition, a connector according to the present invention eliminates the need to increase column sizes over and above earthquake design forces in order to cause the beam to yield before the connector or the column yields. Also, a connector according to the present invention places the hinging/failure point closer to the column than known connectors and thus reduces the secondary moments the column must be designed to withstand in the event of a catastrophic loading event. As a result, the overall beam and column structure is more economical.

Also, a connector according to the present invention provides an improvement in repair economy by promoting the yielding of the connector instead of yielding of the beam. Thus, an element of much smaller size needs to be repaired or replaced after a catastrophic loading event.

Further, a connector according to the present invention, eliminates the lever effect (prying action) of known connectors. Thus, reducing the size of the bolts required to connect the device to the column.

As seen in FIGS. 1–5, the connector 10 according to a first exemplary embodiment of the present invention includes a bulk head 12 for connection to a column and a plate 14 extending from the bulk head for connection to a beam. The connector 10 is preferably die cast for ease of manufacturing and to avoid welded connections within the connector which may create structural weaknesses within the connector. The bulk head 12 has a compact tapered shape which reduces the surface area at the end surface 16 of the bulk head Which comes into contact with the column. This reduced contact area of the end surface 16 provides an advantageous configuration which avoids the prying action of the prior art T-shaped brackets. The tapered shape of the bulk head 12 also requires less steel, and thus provides a cost advantage over larger connectors. The tapered shape of the bulk head 12 is provided by an angled top surface 20 and an angled bottom surface 22 of the bulk head. The two end surfaces 16 and 17 of differing sizes are preferably parallel.

The bulk head 12 includes a series of bores 18 for receiving bolts. The bores 18 are positioned symmetrically above and below the plate 14, and extend from one end surface 16 of the bulk head to the opposite end surface 17 of the bulk head. The bores 18 preferably intersect the angled top and bottom surfaces 20, 22 of the bulk head 12. The diameter of the bulk head bores 18 will depend on the loads experienced by the structure and the size of the bolts required to accommodate the expected loads. The bores 18 may be, for example, 2 inch bores positioned 2 to 5 inches apart along the width of the bulk head and 1 to 3 inches apart along the height of the bulk head. This relatively close and symmetrical spacing of the bores 18 and the thickness of the bulk head between the end surfaces 16, 17 helps prevent the prying effect which occurs in the types of connectors mentioned above.

The bulk head includes side surfaces 28, 29 which are substantially parallel to each other and perpendicular to the two end surfaces 16, 17. Alternatively, the side surfaces 28, 29 may be angled in a manner similar to the top and bottom surfaces 20, 22. By additionally tapering the side surfaces 28, 29, it is possible to further reduce the area of the end surface 16 which contacts the column. Tapered side surfaces 28, 29 will further reduce the amount of material used. The bulk head 12 may also include comer bevels 25 which also reduce the amount of material used to form the bulk head.

A groove 24 is provided in the lower surface 22 of the bulk head 12. This groove 24 is sized to accommodate the web of an I-beam when the plate 14 is attached to the flange of the I-beam. This groove 24 reduces the material of the beam web that must be cut away to attach the connector 10 to the beam. According to the present invention, the groove 24 has a width which depends on the web width, and which allows the bulk head to fit easily over the web. For example, the groove 24 may have a width of approximately 1.5 inches. The groove 24 preferably has a rounded bottom in cross section as shown in FIGS. 4 and 5. The formation of the groove 24 removes additional material and thus, further reduces the weight of the bracket.

The plate 14 extends from the bulk head 12 along a central plane of the larger of the two end surfaces 17 of the bulk head. Since the connector 10 is die cast, the bulk head 12 and the plate 14 are formed integrally in one piece, and do not have structurally weak joint areas.

According to a first embodiment of the present invention, the plate 14 extending from the bulk head 12 is adapted to be bolted to a beam. The plate 14 has a width which is larger than the width of the bulk head 12. The plate 14 includes two triangular portions 26 which adjoin the side surfaces 28, 29 of the bulk head 12. The triangular portions 26 provide further structural support for the plate 14. The plate 14 is provided with two rows of bores 30 for attaching the plate to the flange of a beam with a plurality of bolts.

As shown in FIGS. 1 and 3, the plate 14 includes a first portion 32 adjacent the bulk head 12 and having a first thickness, and a second portion 34 remote from the bulkhead 12 and having a second thickness which is smaller than the first thickness. This difference in thickness along the length of the plate 14 is provided due to the fact that the load on the connector 10 decreases at greater distances from the column.

As shown in FIGS. 1 and 3, the change in thickness of the plate 14 may be accomplished by a single step 36 located between a first pair of bores located closest to the bulkhead 12 and the adjacently positioned second pair of bores 30. Alternatively, the step 36 may be formed between other pairs of bores 30 or successive steps may be provided between successive pairs of bores. Alternatively, the reduction in thickness can be a gradual reduction in thickness without the use of steps.

The reduction in thickness of the plate 14 serves at least two purposes. First, the magnitude of the stress exerted on the plate 14 decreases as the distance from the bulk head 12 increases. Thus, the reduction in thickness of the plate 14 tends to tune the strength of the plate to the amount of stress that the plate will be subjected to at any particular location. This is beneficial as it leads to structural yielding in a gradual manner rather than catastrophic yielding of the structure. Second, the reduction in thickness reduces the total amount of material used and thus, the total weight and cost of the connector.

As an example, the connector 10 can be tuned by diminishing its thickness as it extends from the bulk head 12 to achieve yields comparable to A36 steel beams (Fy=36 ksi minimum) when used in combination with A572 steel (Fy= 50 ksi) beams and columns. The advantage in this case is that the structure can be designed as a rigid frame with equivalent A36 beam properties and also have the beams and columns protected by the connector which acts as a "fuse".

The thickness of the bulk head 12 according to the present invention between the two end surfaces 16, 17 is preferably quite large as compared to the prior art fittings. For example, the ratio of the thickness of the bulk head 12 to a critical height of the bulk head, measured from the center of plate 14 to the center of the bore holes 18, is between 1:1 and 1:3, preferably 1:2. By way of example, the critical height may be 2 inches while the thickness of the bulkhead between the two end surfaces 16, 17 may be 4 inches. These dimensions may, of course, vary depending upon the particular loading conditions.

By way of example, the first portion 32 of the plate may have a thickness of 0.5 to 2.5 inches, preferably approximately the thickness of the beam flange, while the second portion 34 of the plate may have a thickness slightly less than the first portion 32, depending upon the stress conditions experienced by the second portion 34. These dimensions may, of course, vary depending upon the particular loading conditions for which the connector is designed.

According to the present invention, the plate 14 preferably includes fins 38 which provide a support surface for a deck floor or roof. The fins 38 preferably have a thickness which is smaller than the thickness of the plate 14 and extend from the lower surface of plate 14 as shown in FIG. 5. The two fins 38 lie in a common plane with the bottom surface of the plate 14. The two fins 38 are also disposed along opposite sides of the plate 14. The use of the connector according to the present invention including the fins 38 allows a single element to perform both functions of connecting beams to columns and supporting a deck floor or roof on a beam.

Figure 7:
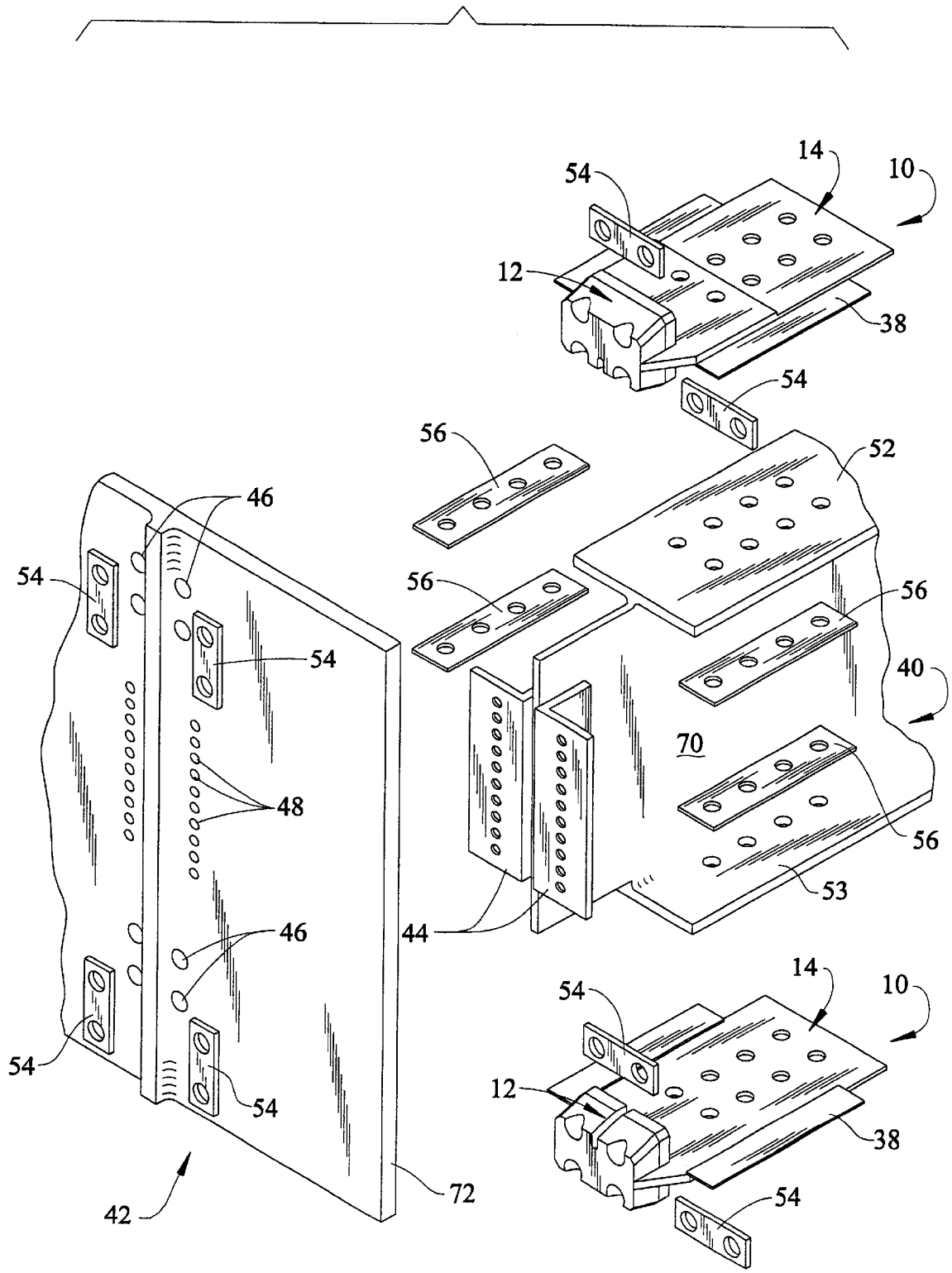
FIG. 7 is an exploded view of the connection of FIG. 6.

The connection of a beam 40 to a column 42 is illustrated in FIGS. 6 and 7 with a connector 10 according to the first exemplary embodiment. When the connector 10 is placed on the flange 52 of a beam and then bolted in place, the bottom surface of the plate 14 rests on the beam flanges 52, 53 and the fins 38 extend beyond the sides of the beam to provide a support surface extending from the beam on which a deck floor or roof is supported. In addition to the function of supporting a deck floor or roof, the fins 38 also provide reinforcement and strengthening of the plate 14 to prevent buckling from compression stresses, particularly in the area between the bulk head 12 and the first set of holes 30. Because the deck floor or roof is usually supported on the top flange of the beam, the top of fin 38 should be in the same plane as the top plane of the beam when the connector 10 is mounted on the beam. Thus, the deck floor or roof may be supported on the fins 38 and/or the top of the beam which are provided at the same level to support the deck.

FIG. 6 illustrates the connection of a beam 40 to a column 42 with two connectors 10 according to the present invention, and a conventional clip angle 44. FIG. 7 is an exploded view of the connection assembly of FIG. 6. As seen in FIG. 7, portions of the top and bottom flanges 52, 53 of the beam 40 which are closest to the column are cut away to accommodate the connectors 10. The plates 14 of the connectors 10 are bolted to the flanges 52, 53 of the beam by bolts 50. When the connection between the beam 40 and column 42 is completed, a space 55 is provided between the bulk head 12 of the connector 10 and the flange 72 of the column 42 to which the beam is attached. This space 55 allows for construction tolerance and is shimmed. The web 70 of the beam 40 is preferably also attached to the flange 72 of the column by the pair of clip angles 44 which provide vertical/shear structural support for the connection but no flexural support. To ensure that the clip angles 44 will only support vertical/shear loads, bolt holes are provided in the clip angles for attachment to the beam web which are slotted horizontally to allow for movement of the bolts.

As illustrated in FIG. 7 the flange 72 of the column 42 is provided with two sets of four bores 46 for attachment of the bulk heads 12 of the connectors 10, and two rows of smaller bores 48 for attachment of the clip angles 44.

The connectors 10 are provided with support plates 54 received on opposite sides of the bulk head bolted connections. In addition, support plates 56 are preferably received on the inside surfaces of the top and bottom flanges 52, 53 of the beam 40 for connection of the plates 14 to the beam. The support plates 54, 56 prevent the flanges of the beam 52, 53 from buckling and may also be desirable between the bulkhead and the first set of bolts to the beam to prevent buckling of plate 32.

Although the connector 10 is illustrated as connected to the flange 72 of the column 42, the beam may also be attached to the column in an orientation which is perpendicular to the orientation shown in FIGS. 6 and 7. In this alternative orientation, the connector 10 is attached to the web of the column between the flanges. The beam 40 may also be attached to the column 42 at an angle by angling the end surface 16 of the connector 10.

Figure 8:
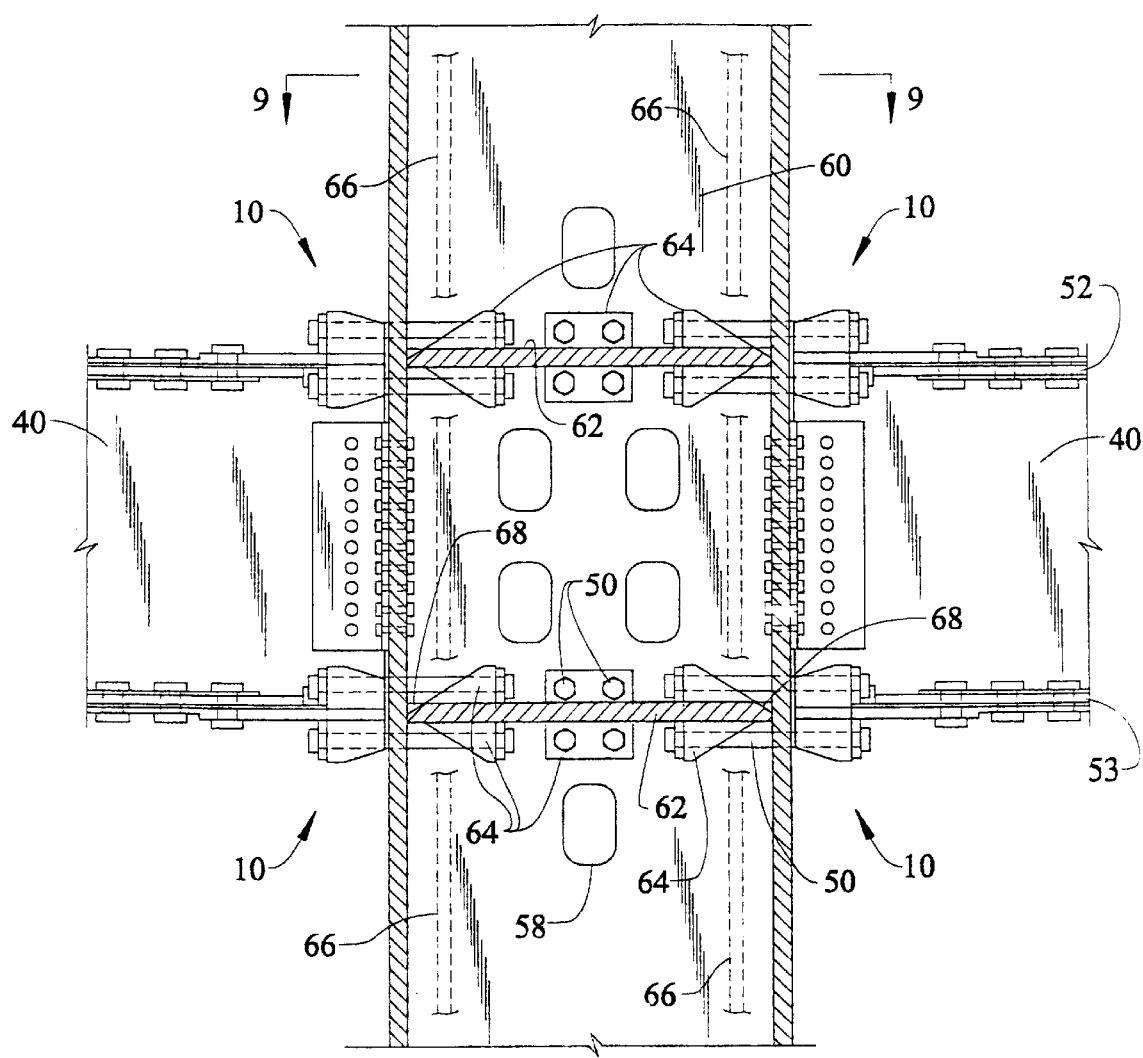
FIG. 8 is a cross sectional view of a box column which is connected to a beam at each side by connectors according to the first embodiment of the present invention.
Figure 9:
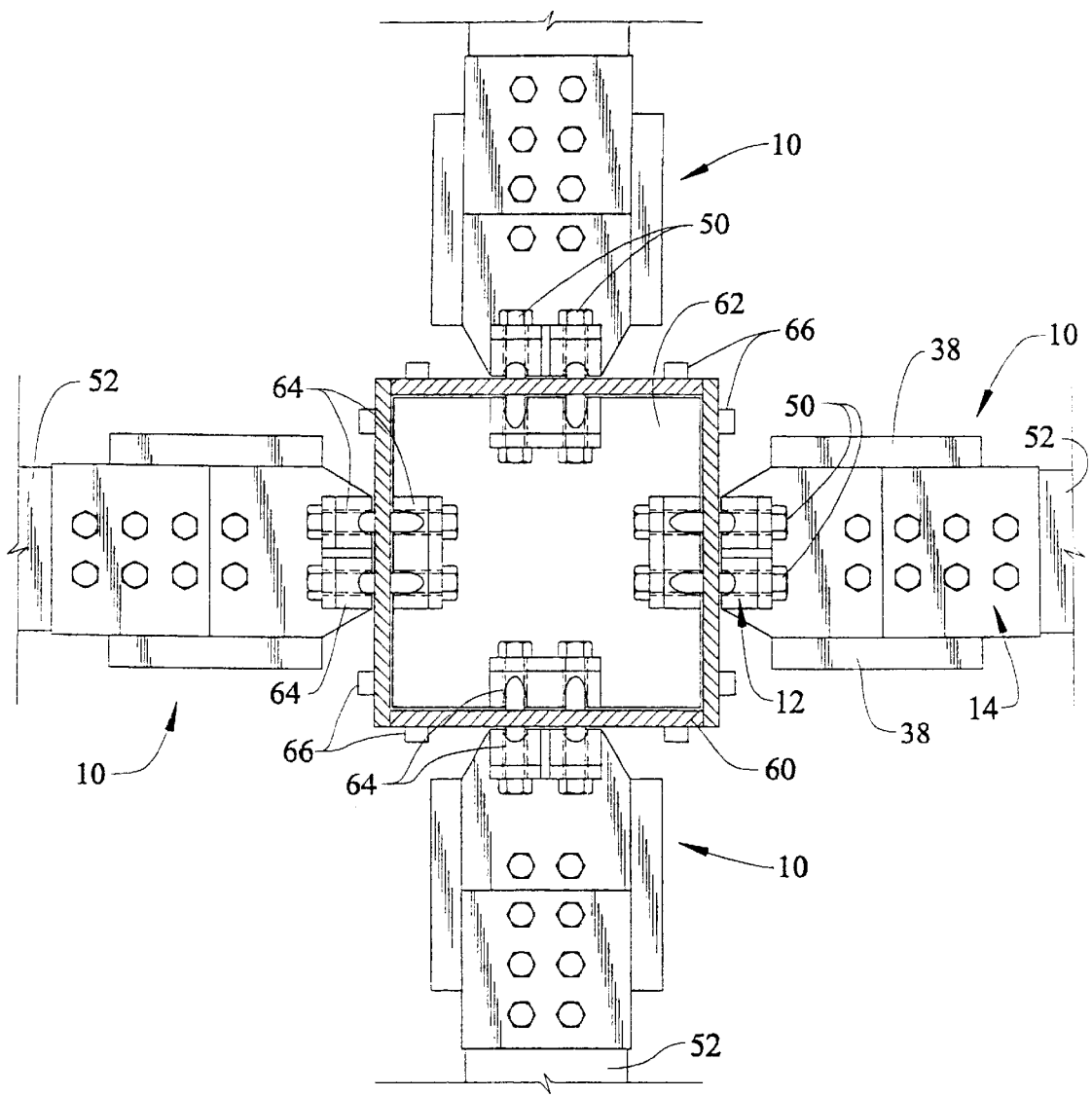
FIG. 9 is a top cross sectional view taken along 6—6 of the box column, connector brackets, and beams of FIG. 8.

The connector 10 according to the present invention may also be used to connect up to four beams 40 to a box column 60, as shown in FIGS. 8 and 9 or to connect a multitude of beams to column shapes which allow more than four beams to connect to the column. FIG. 8 illustrates a vertical cross section through a box column 60, while FIG. 9 illustrates a top cross-sectional view taken along line 6—6 of FIG. 8. A pair of connectors 10, or such as the connector illustrated in FIGS. 1–5, is used at an exterior of the box column 60 to attach each of the beams 40 to the box column at the top and bottom flanges 52, 53 of each of the beams. Two additional plate shaped connectors 62 are provided on the interior of the box column 60 for attachment to the connectors 10. According to this embodiment, access holes 58 are provided in the box column 60 to allow access to the interior of the column for installation. The box column 60 is also preferably provided with reinforcing plates 66 which are formed on the exterior of the column to offset the material loss caused by the access holes 58.

The plate shaped connectors 62 have a substantially rectangular shape or will take the shape of the particular column (e.g. circular, hexagon, etc.) when viewed from the top as shown in FIG. 9 and fit inside the box column 60 with a small amount of play or clearance between the plate shaped connector 62 and the interior surfaces on the sides of the column. The thickness of plate 62 varies depending on stress requirements and may have stiffener plates or ribs 67 projecting perpendicular to its plane to control buckling. For the box column configuration, four bolt receiving brackets 64 are attached to the top surface of each plate shaped connector 62, and four bolt receiving brackets 64 are attached to the lower surface of each plate shaped connector 62. Each of the bolt receiving brackets 64 has two bores 74 for receiving the bolts 50. The bolt receiving brackets 64 preferably have a tapered shape which tapers from a largest dimension farthest from the edge of the plate to a smallest dimension at the edge of the plate.

The plate shaped connectors 62 are preferably formed in the same manner as the connectors 10, that is by die casting. The plate shaped connectors are preferably welded by a partial penetration weld 68 at a location where the bolt receiving brackets 64 meet the walls of the box column 60. These welds 68 will help to secure the plate shaped connectors 62 in position and serve to transfer shear forces from column to beam.

As noted above, the connector 10 according to the present invention is die cast which avoids any joints which would provide structurally weak areas in the connector construction. The particular configuration and dimensions of the connector 10 are preferably designed so that the strength of the connector is tuned to a particular application. The connector 10 may be tuned to prevent sudden failures by configuring the connector to yield in a gradual manner. The tuning of the connector 10 may be performed by varying the thickness, width, and length of the plate 14, and/or by varying the size and thickness of the fins 38.

According to a second exemplary embodiment of the present invention a connector 76 includes a plate 78 that extends from the bulkhead 12 and is adapted to be welded to a beam rather than bolted to a beam as discussed in reference to the first exemplary embodiment. The bulk head 12 of the connector 76 according to the second exemplary embodiment is structurally identical the bulk head 12 discussed in reference to the first exemplary embodiment. The plate 78 includes a rear portion 80 adjacent to the bulk head 12 and a tapered or convex portion 82 extending from the rear portion 80. The plate 78 is welded to a beam along edges 84 of the tapered portion 82. As in the first exemplary embodiment, the plate 78 includes two triangular portions 85 that adjoin the side surfaces 28, 29 of the bulk head 12. The triangular portions 85 lend structural support to the plate 78.

When connecting a beam to a column, the tapered portion 82 of the connector is welded to the beam. The connector 76 is loaded such that the weld between the beam and the plate 78 is subjected to mainly shear forces during abnormal loading. Generally, a weld is less brittle in shear than in tension. Therefore, the welded connection between the plate 78 and the beam can be sufficiently strong and ductile to prevent the weld from failing during catastrophic loading of a beam and column structure.

The edges 84 of the tapered portion 82 of the plate 78 converge toward a tip portion 86 of the plate 78. In the exemplary embodiment shown, the tapered portion 82 is generally triangular-shaped. Preferably, the tip portion 86 of the plate 78 is rounded so as minimize stress concentration in the plate 78 resulting from sharp corners. The converging edges 84 provide a longer welding surface than a plate extending the same distance from the bulk head 12 and that has parallel edges (e.g., a rectangular-shaped plate). Preferably, the edges 84 converge at an angle $\theta$ of less than 45°. The angle $\theta$ is measured from an axis 89 extending from, and parallel to, each side of the rear portion 80. A converging angle of less than 45° maximizes the length of the converging edges 84. Thus, the tapered portion 82 of the plate 78 allows for more, or longer welds between the plate 78 and a beam, resulting in a strong connection between the plate 78 and a beam.

The strong welded connection allows the welded plate 78 to cover a relatively short length of the beam as compared to a bolted plate of comparable strength. This is due to the bolts in the bolted plate necessarily being spaced from one another. In contrast, a weld can be a continuous connection between the welded plate 78 and a beam. Because the welded plate 78 can be relatively short, it has less impact on the overall structure, e.g., interference with the floor decking supported by the beam, than a comparable connector having a bolted connection between the plate and the column.

In addition, the tapered portion 82 of the plate 78 reduces the amount of material required for a connector casting, thereby reducing the weight and cost of the connector as compared with connectors having conventional, rectangular-shaped plates.

The connector 76 preferably includes fins 87 to provide a support surface for a deck floor or a roof. The fins 87 project from the rear portion 80 of the plate 78. The top surfaces of the fins 87 are located in the same plane as the bottom surface of the plate.

The connector 76 is constructed so that the plate 78 itself yields before both the bolted connection between the bulk head 12 and a column yields and the welded (or bolted, as in the first embodiment) connection between the plate 78 and a beam yields. Thus, the rear portion 80 of the plate 78, which is not welded to the beam, yields (e.g., stretches) before the rest of the connector yields. Accordingly, after an earthquake, or other abnormal loading event, the connector 76 can be inspected for signs of yielding and replaced as necessary. In this way, a connector according to the present invention can act as an indicator of damage to the overall structure in addition to acting as a fuse to prevent the connected columns and beams of the overall structure from failing when subjected to catastrophic loads.

The plate 78 also includes tuning holes 88. The tuning holes 88 are used to adjust the tensile strength of the plate 78. The tuning holes 88 are located in a portion of the plate 78 that is not attached to the beam. More specifically, the tuning holes 88 are located in the rear portion 80 of the plate 78, and preferably halfway between the end surface 17 of the bulk head 12 and the beginning of the tapered portion 82 of the plate 78. Placing the tuning holes 88 in the unattached portion of the plate allows their effect to be predictable. Although tuning holes 88 are described in reference to a second exemplary embodiment of the invention, tuning holes can also be used in conjunction with a first embodiment of the invention.

The tuning holes 88 can compensate for the variability in connector castings. For example, if it is desired that a connector have a tensile yield strength (Fy) of 36 ksi, and tests show that the casting has a higher yield strength than 36 ksi, tuning holes can be added to the plate to decrease the overall yield strength of the connector to one that is equivalent to 36 ksi. The addition of tuning holes 88 creates a weakened plane in the plate 78 that intersects the approximate center of the tuning holes 88 in the connector.

Preferably, the strength of the plate is adjusted further with notches 89 in the fins 87 on either side of the plate. The fins 87 add to the cross sectional area of the plate 78 and thus add to the strength of the rear portion 80 of the plate 78. Consequently, a part of the tapered portion 82 of the plate 78 immediately adjacent the rear portion 80, which is not welded to the beam, may have a smaller cross sectional area than the rear portion 80 along the weakened plane that intersects the tuning holes 88. Adding the notches 89 in the fins 87 ensures that the weakened plane created by the tuning holes 88 is the weakest part of the plate 78, and provides predictability as to where the plate 87 will yield.

Figure 10:
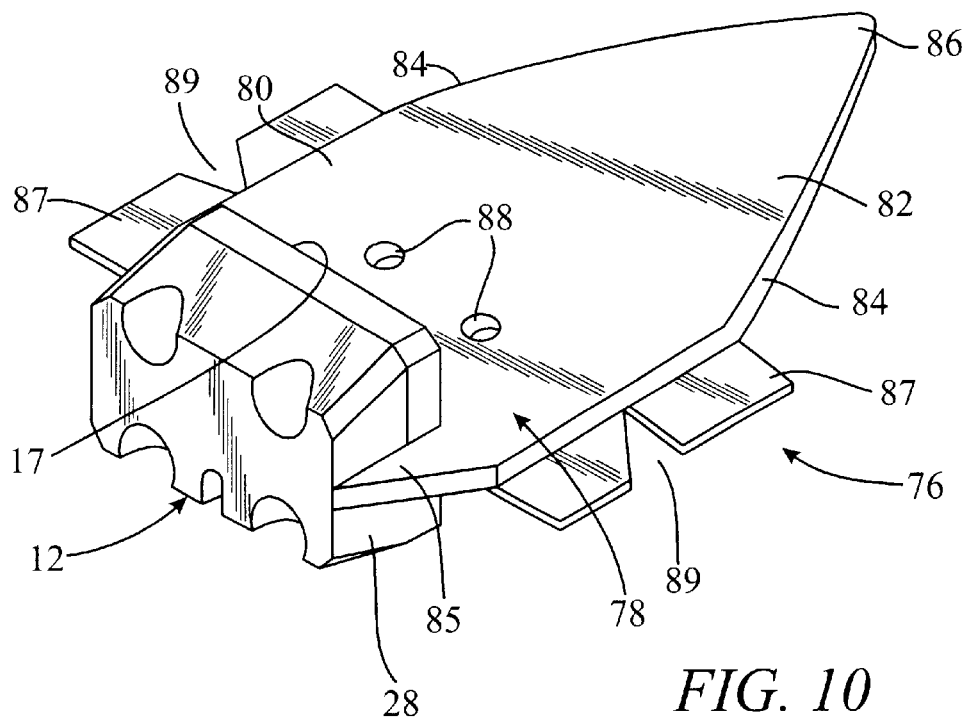
FIG. 10 is a perspective view of a second exemplary embodiment of a connector according to the present invention.
Figure 11:
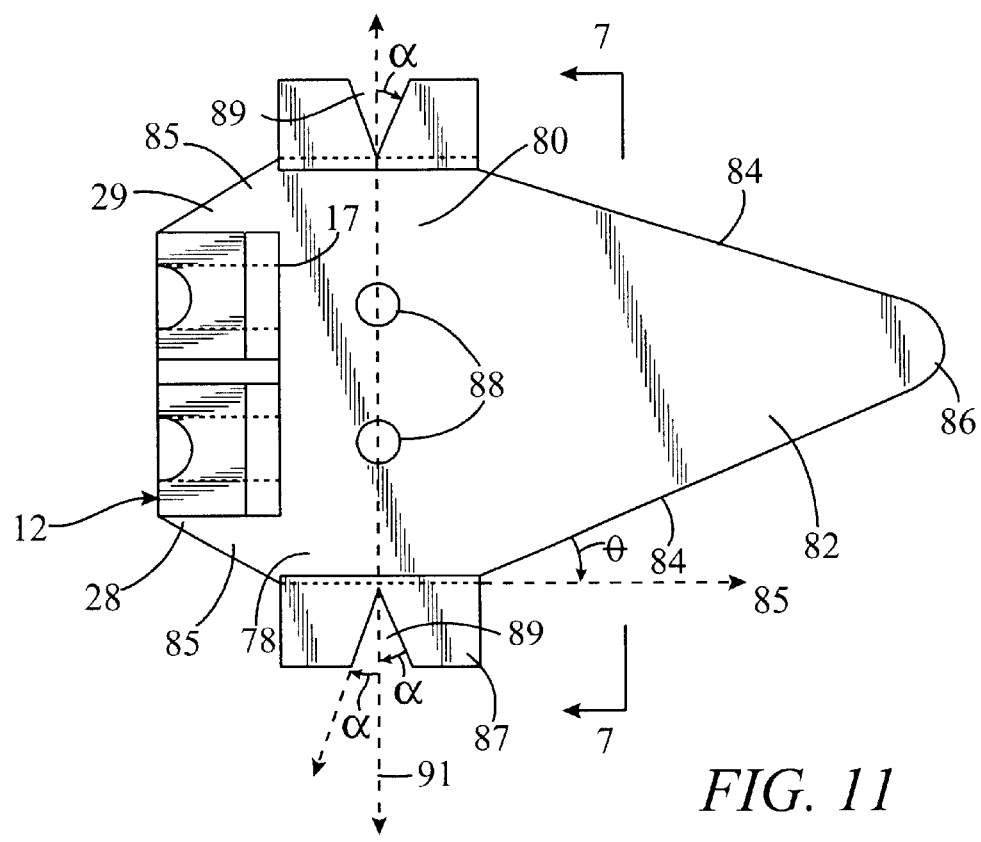
FIG. 11 is a bottom view of the connector of FIG. 10.
Figure 12:
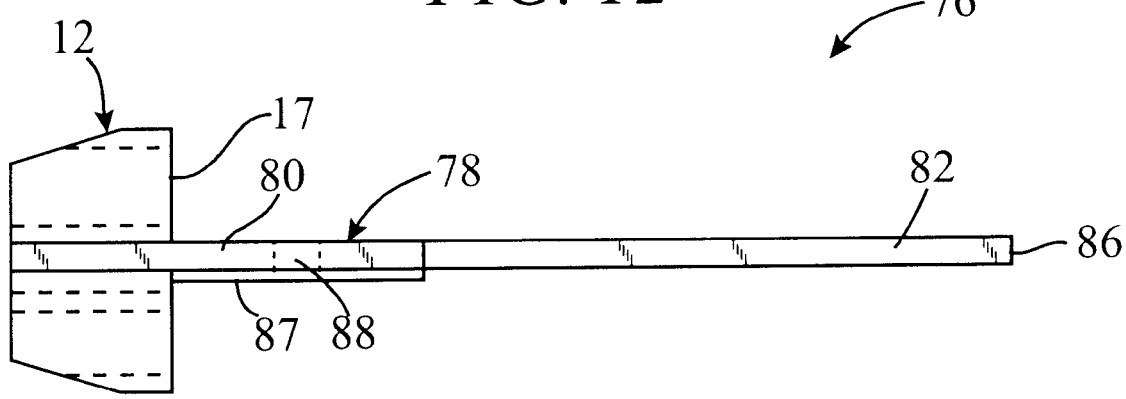
FIG. 12 is a side view of the connector of FIG. 10.
Figure 13:
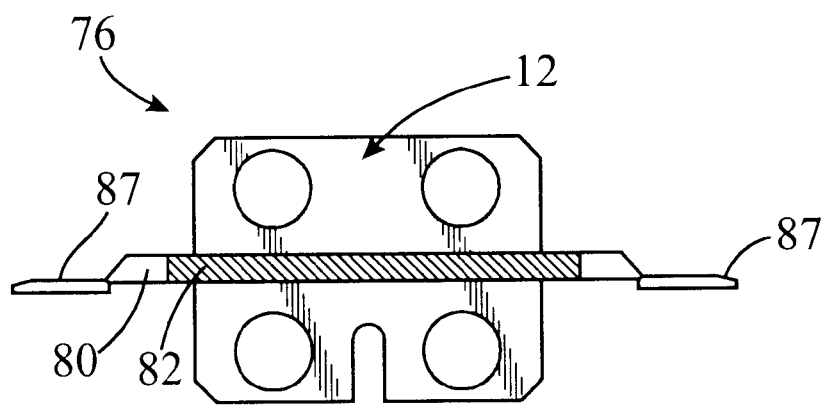
FIG. 13 is a sectional view of the connector taken along line 7—7 of FIG. 11.
Figure 14:
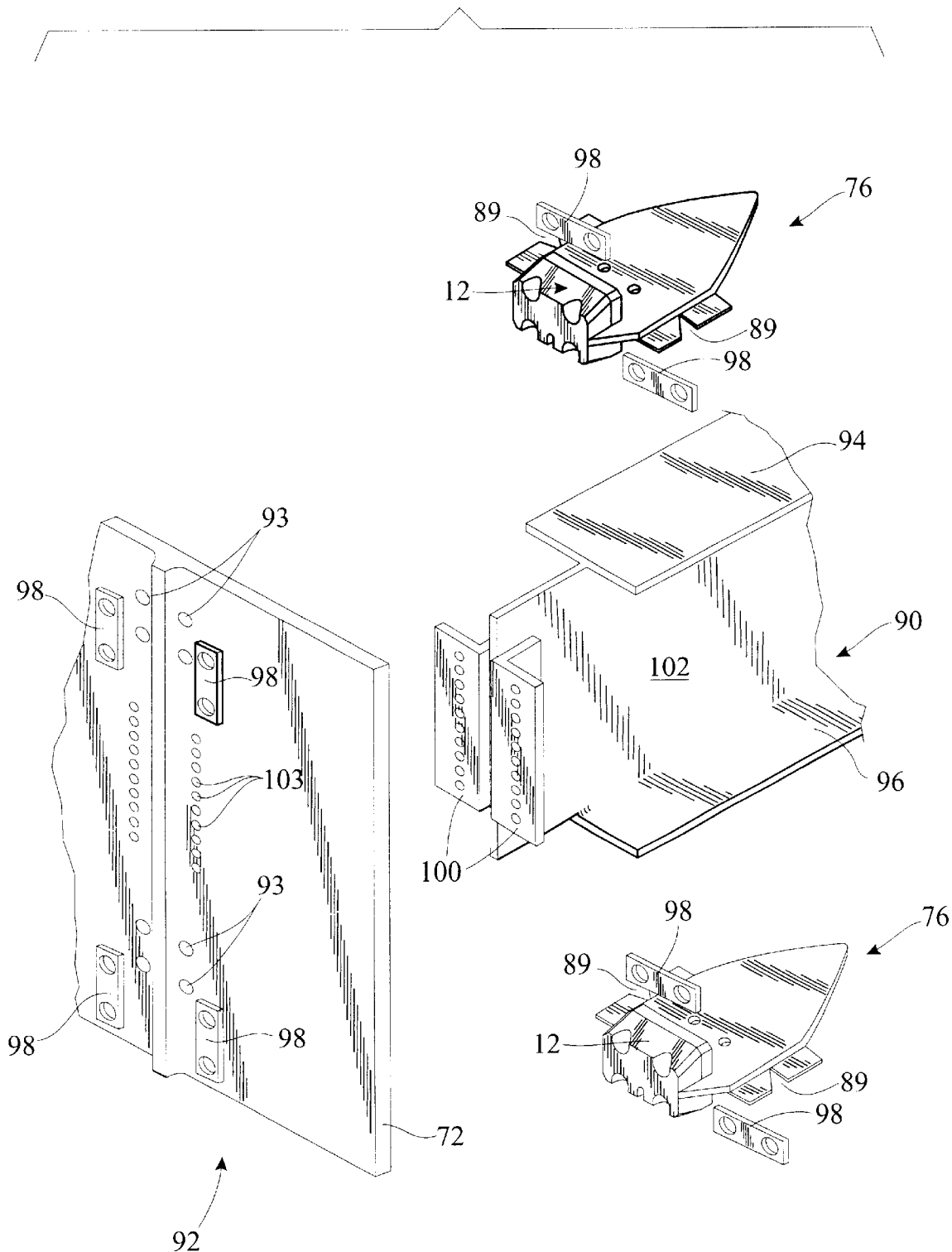
FIG. 14 is an exploded perspective view of a column and a beam connected by a connector according to a second exemplary embodiment of the present invention.

The notches 89 are configured to align with the tuning holes 88 to further weaken the weakened plane created by the tuning holes 88. For example, as seen in FIGS. 10, 11 and 14, the notches are triangular-shaped and have vertexes that are aligned with an axis 91 that intersects the approximate center of the tuning holes 88. Preferably, each side of the triangular notch 89 is sloped with respect to the axis 91 at a small angle a (for example about 30°) so that the amount of material that is removed from the fins 87 is minimized. Although the exemplary embodiment shows a triangular-shaped notch 89, a notch can also be a slit or rectangular break in the fins 87 which is aligned with the weakened plane.

A connector according to the second exemplary embodiment can be assembled to connect column beam and column structures as discussed in detail with reference to FIGS. 7–9. However, according to the second exemplary embodiment, the plate is welded to a beam rather than bolted to a beam as in the first embodiment.

FIG. 14 shows an exploded view of an exemplary connection between a beam 90 and column 92 employing connectors 76 according to a second embodiment of the present invention. As in a connection according to the first exemplary embodiment, portions of the top and bottom flanges 94, 96 of the beam 90 that are closest to the column 92 are cut away to accommodate the connectors 76. The column includes four bores 93 that receive bolts threaded through the bulk head 12 of the connector 76.

The plates 78 are welded to the flanges 94, 96 of the beam 90. In some cases it may be desirable to weld the plates 78 to the beam 90 before the beam 90 is transported to a construction site. Support plates 98 are positioned on opposite sides the bulk head 12 to reinforce the bolted connection between the column 92 and the bulk head 12 of the connector 78.

Preferably, clip angles 100 are used to secure a web 102 of the beam 92 to provide added vertical support to the connection between the column 92 and the connector 76. The column 92 includes two rows of small bores 103 for receiving bolts for the clip angles 100. The bolt holes for the clip angles 100 are provided with horizontal slots to ensure that the clip angles add structural support only in the vertical direction.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A structural system, comprising:
   a structural column;
   a structural beam; and
   a connector for connecting the beam to the column, comprising:
      a bulk head having a first surface abutting the column and a second surface opposite the first surface, the first surface being smaller in area than the second surface, the bulk head having a plurality of bores connecting the first surface to the second surface, and an angled top surface and an angled bottom surface, wherein each of the bores intersect one of the angled top surface and the angled bottom surface; and
      a plate extending from the second surface of the bulk head, the plate having a tapered portion that diminishes in a width dimension as the tapered portion extends away from the second surface toward a free end.

2. The system of claim 1, wherein the tapered portion of the plate is welded to the beam.

3. The system of claim 1, wherein the plate has a curved tip portion.

4. The system of claim 1, wherein the tapered portion of the plate includes converging sides that converge at an angle of 45 degrees or less.

5. The system of claim 1, wherein the plate includes one or more tuning holes for adjusting a tensile capacity of the plate.

6. A structural system, comprising:
   a structural column;
   a structural beam; and
   a connector for connecting the beam to the column, comprising:
      a bulk head having a first surface abutting the column and a second surface opposite the first surface, the first surface being smaller in area than the second surface, the bulk head having a plurality of bores connecting the first surface to the second surface; and
      a plate extending from the second surface of the bulk head, the plate having a tapered portion that diminishes in a width dimension as the tapered portion extends away from the second surface toward a free end, the plate connected to the beam, and wherein the plate includes a rear portion between the second surface and the tapered portion and wherein the one or more tuning holes are located in the rear portion of the plate.

7. The system of claim 6, wherein the one or more tuning holes are located approximately midway between the second surface of the bulk head and the tapered portion of the plate.

8. A structural system, comprising:
   a structural column;
   a structural beam; and
   a connector for connecting the beam to the column, comprising:
   a bulk head having a first surface abutting the column and a second surface opposite the first surface, the first surface being smaller in area than the second surface, the bulk head having a plurality of bores connecting the first surface to the second surface and wherein the bulk head includes four bores extending through the bulk head from the first surface to the second surface for receiving bolts to connect the bulk head to a column, and wherein the plate extends from the second surface of the bulk head such that two of the four bores are located on one side of the plate and the other two bores are located on an opposite side of the plate; and
   a plate extending from the second surface of the bulk head, the plate having a tapered portion that diminishes in a width dimension as the tapered portion extends away from the second surface toward a free end, the plate connected to the beam.

9. A structural system, comprising:
   a structural column;
   a structural beam; and
   a connector for connecting the beam to the column, comprising:
   a bulk head having a first surface abutting the column and a second surface opposite the first surface, the first surface being smaller in area than the second surface, the bulk head having a plurality of bores connecting the first surface to the second surface, and an angled top surface and an angled bottom surface, wherein each of the bores intersect one of the angled top surface and the angled bottom surface; and
   a plate extending from the second surface of the bulk head, the plate having a tapered portion that diminishes in a width dimension as the tapered portion extends away from the second surface toward a free end, the plate connected to the beam.

10. A connector for connecting a beam to a column, comprising:
    a bulk head having a first surface for abutting a column and a second surface opposite the first surface, the first surface being smaller in area than the second surface, the bulk head having a plurality of bores connecting the first surface to the second surface, wherein the bulk head includes an angled top surface and an angled bottom surface and each of the four bores intersect one of the angled top surface and the angled bottom surface;
    a plate extending from the bulk head, the plate having a tapered portion that diminishes in a width dimension as the tapered portion extends away from the second surface toward a free end, wherein a ratio of a thickness of the bulk head between the first and second surfaces to a critical height of the bulk head measured from a center of the plate to a center of one of the bores is between 1:1 and 1:3.

11. A structural system, comprising:
    a structural column;
    a structural beam; and
    a connector for connecting the beam to the column, comprising:
    a bulk head having a first surface abutting the column and a second surface opposite the first surface, the first surface being smaller in area than the second surface, the bulk head having a plurality of bores connecting the first surface to the second surface; and
    a plate extending from the second surface of the bulk head, the plate having a tapered portion that diminishes in a width dimension as the tapered portion extends away from the second surface toward a free end, the plate connected to the beam, wherein a portion of the plate extends in the width dimension outside at least two edges of the second surface.

12. A connector for connecting a beam to a column, comprising:
    a bulk head having a first surface for abutting a column and a second surface opposite the first surface, the first surface being smaller in area than the second surface, the bulk head having a plurality of bores connecting the first surface to the second surface, the bulk head includes side surfaces; and
    a plate extending from the bulk head, the plate having a tapered portion that diminishes in a width dimension as the tapered portion extends away from the second surface toward a free end, and the plate includes two triangular portions which adjoin the side surfaces of the bulk head.

13. The system according to claim 1, further comprising deck floor supports extending in a plane parallel to the plate.

14. A connector for connecting a beam to a column, comprising:
    a bulk head having a first surface for abutting a column and a second surface opposite the first surface, the first surface being smaller in area than the second surface, the bulk head having a plurality of bores connecting the first surface to the second surface;
    a plate extending from the bulk head, the plate having a tapered portion that diminishes in a width dimension as the tapered portion extends away from the second surface toward a free end;
    deck floor supports extending in a plane parallel to the plate; and
    notches in the deck floor supports, the notches are for adjusting the tensile strength of the plate.

15. The connector according to claim 14, further comprising tuning holes for adjusting a tensile capacity of the plate, wherein the notches are aligned with the tuning holes.

16. A connector for connecting a beam to a column, comprising:
    a bulk head having a first surface for abutting a column and a second surface opposite the first surface, the first surface being smaller in area than the second surface, the bulk head having a plurality of bores connecting the first surface to the second surface, wherein the bulk head includes a groove formed in one side of the bulk head and extending from the first surface to the second surface for receiving a portion of a web of a beam;

a plate extending from the bulk head, the plate having a tapered portion that diminishes in a width dimension as the tapered portion extends away from the second surface toward a free end.

* * * * *